United States Patent
Chen et al.

(10) Patent No.: US 10,290,479 B2
(45) Date of Patent: May 14, 2019

(54) ONLINE MONITORING OF FUEL CELL REACTIONS BY DESORPTION ELECTROSPRAY MASS SPECTROMETRY

(71) Applicant: Ohio University, Athens, OH (US)

(72) Inventors: Hao Chen, Athens, OH (US); Ning Pan, Jinan (CN); Howard Dewald, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 14/441,245

(22) PCT Filed: Nov. 7, 2013

(86) PCT No.: PCT/US2013/068922
§ 371 (c)(1),
(2) Date: May 7, 2015

(87) PCT Pub. No.: WO2014/074699
PCT Pub. Date: May 15, 2014

(65) Prior Publication Data
US 2015/0288013 A1    Oct. 8, 2015

Related U.S. Application Data

(60) Provisional application No. 61/723,452, filed on Nov. 7, 2012.

(51) Int. Cl.
*H01J 49/00* (2006.01)
*H01M 8/0444* (2016.01)
(Continued)

(52) U.S. Cl.
CPC ......... *H01J 49/0031* (2013.01); *H01J 49/04* (2013.01); *H01M 8/0447* (2013.01);
(Continued)

(58) Field of Classification Search
None
See application file for complete search history.

(56) References Cited

U.S. PATENT DOCUMENTS

2004/0079881 A1*  4/2004  Fischer ............... H01J 49/0445
                                                        250/288
2007/0228271 A1   10/2007  Truche et al.
(Continued)

FOREIGN PATENT DOCUMENTS

EP          2051283 A2    4/2009

OTHER PUBLICATIONS

Zhao et al., "Quantitative Online Detection of Volatile and Nonvolatile Methanol Electrooxidation Products by Combined Electron Impact Mass Spectrometry and Electrospray Ionization Mass Spectrometry", ECS Transactions, 2011.*
(Continued)

*Primary Examiner* — James Choi
(74) *Attorney, Agent, or Firm* — Wood Herron & Evans LLP

(57) ABSTRACT

A mass spectrometry-based method of directly online detecting fuel cell reaction products includes passing a reactant sample (16) through a fuel cell (12) to form reaction products that exit the fuel cell (12) in an output stream (26). The method also includes adding a derivatizing reagent (32) to the output stream (28) to form a derivatized output stream (34), wherein the derivatizing reagent (32) reacts with a potential reaction product to thereby form a derivatized reaction product if the potential reaction product is present. The method further includes directing a charged solvent (44) toward the derivatized output stream (34) to thereby ionize the derivatized output stream (34) and directing the ionized,
(Continued)

derivatized output stream (54) to a mass spectrometer (14), the mass spectrometer (14) being configured to detect the derivatized reaction product.

17 Claims, 3 Drawing Sheets

(51) Int. Cl.
    H01M 8/10         (2016.01)
    H01M 8/0662       (2016.01)
    H01M 8/1011       (2016.01)
    H01J 49/04        (2006.01)
    H01M 8/1018       (2016.01)

(52) U.S. Cl.
    CPC ..... *H01M 8/04462* (2013.01); *H01M 8/0662* (2013.01); *H01M 8/10* (2013.01); *H01M 8/1011* (2013.01); *H01M 2008/1095* (2013.01); *H01M 2300/0082* (2013.01); *Y02E 60/523* (2013.01)

(56) References Cited

U.S. PATENT DOCUMENTS

| | | | |
|---|---|---|---|
| 2007/0259410 A1* | 11/2007 | Donaldson | C12N 9/0006 435/148 |
| 2008/0087811 A1 | 4/2008 | Knapp | |
| 2008/0314129 A1 | 12/2008 | Schultz et al. | |
| 2009/0095900 A1* | 4/2009 | Whitehouse | H01J 49/0027 250/282 |
| 2010/0059674 A1 | 3/2010 | Chen et al. | |
| 2010/0258717 A1* | 10/2010 | Chen | H01J 49/0431 250/288 |
| 2011/0253903 A1 | 10/2011 | Sun et al. | |
| 2012/0286155 A1* | 11/2012 | Mulligan | H01J 49/0445 250/282 |
| 2013/0023005 A1 | 1/2013 | Chen et al. | |

OTHER PUBLICATIONS

Van Loon et al., Methanol Reaction with Sulfuric Acid: A Vibrational Spectroscopic Study, J. Phys. Chem. B 2004, 108, 17666-17674.*
Bai, H.; Ho, S. W. Polym. Int. 2011, 60, 26-41.
Bond, A. M.; Colton, R.; D'Agostino, A.; Downard, A. J.; Traeger, J. C. Anal. Chem. 1995, 67, 1691-1695.
D.R., P.; L.M., R. Polymer 2008, 49, 3187-3204.
Djilali, N. Energy 2007, 32, 269-280.
Ferguson, C. N.; Benchaar, S. A.; Miao, Z. X.; Loo, J. A.; Chen, H. Anal. Chem. 2011, 83, 6468-6473.
International Preliminary Report on Patentability in corresponding International Patent Application No. PCT/US2013/068922, dated May 12, 2015, 10 pgs.
International Search Report and Written Opinion in corresponding International Patent Application No. PCT/US2013/068922, dated Feb. 11, 2014, 14 pgs.
Iwasita-Vielstich, T. Advances in Electrochemical Science and Engineering; VCH Verlagsgesellschaft: Weinheim: Germany, 1990.
Jusys, Z.; Massong, H.; Baltruschat, H. J. Electrochem. Soc. 1999, 146, 1093-1098.
Leuthold, L. A.; Mandscheff, J. F.; Fathi, M.; Giroud, C.; Augsburger, M.; Varesio, E.; Hopfgartner, G. Rapid Commun. Mass Spectrom. 2006, 20, 103-110.
Li, J. et al., "Online Coupling of Electrochemical Reactions with Liquid Sample Desorption Electrospray Ionization-Mass Spectrometry", Analytical Chemistry, vol. 81, No. 23, Dec. 1, 2009, pp. 9716-9722.
Lu, M.; Wolff, C.; Cui, W.; Chen, H. Anal. Bioanal. Chem. 2012, 403, 355-365.

Miao, Z.; Chen, H. J. Am. Soc. Mass Spectrom. 2009, 20, 10-19.
Miao, Z.; Chen, H.; Liu, P.; Liu, Y. Anal. Chem. 2011, 83, 3994-3997.
Miao, Z.; Wu, S.; Chen, H. J. Am. Soc. Mass Spectrom. 2010, 21, 1730-1736.
Ota, K. I.; Nakagawa, Y.; Takahashi, M. J. Electroanal. Chem. 1984, 179, 179-186.
Permentier, H. P.; Bruins, A. P. J. Am. Soc. Mass Spectrom. 2004, 15, 1707-1716.
Permentier, H. P.; Jurva, U.; Barroso, B.; Bruins, A. P. Rapid Commun. Mass Spectrom. 2003, 17, 1585-1592.
Roussel, C.; Dayon, L.; Lion, N.; Rohner, T. C.; Josserand, J.; Rossier, J. S.; Jensen, H.; Girault, H.H. J. Am. Soc. Mass Spectrom. 2004, 15, 1767-1779.
Song, C. Catal Today 2002, 77, 17-49.
Steele, B. C. H.; Heinzel, A. Nature 2001, 414, 345-352.
Sun, X.; Miao, Z.; Yuan, Z.; Harrington, P. B.; Colla, J.; Chen, H. Int. J. Mass Spectrom. 2011, 301, 102-108.
Thiam, H. S.; Daud, W. R. W.; Kamarudin, S. K.; Mohammad, A. B.; Kadhuma, A. A. H.; Loh, K. S.; Majlan, E. H. Int. J Hydrogen Energy 2011, 36, 3187-3205.
Wang, H.; Rus, E.; Abruna, H. D. Anal. Chem. 2010, 82, 4319-4324.
Wasmus, S. et al., "Real-Time Mass Spectrometric Investigation of the Methanol Oxidation in a Direct Methanol Fuel Cell", Journal of the Electrochemical Society, vol. 142, No. 11, Nov. 1995, pp. 3825-3833.
Wolter, O.; Heitbaum, J. Ber. Bunsen-Ges. Phys. Chem. 1984, 88, 2-6.
Xu, X.; Lu, W.; Cole, R. B. Anal. Chem. 1996, 68, 4244-4253.
Zhang, Y.; Chen, H. Int. J. Mass Spectrom 2010, 289, 98-107.
Zhang, Y.; Cui, W.; Zhang, H.; Dewald, H. D.; Chen, H. Anal. Chem. 2012, 3838-3842.
Zhang, Y.; Dewald, H. D.; Chen, H. J. Proteome Res. 2011, 10, 1293-1304.
Zhang, Y.; Yuan, Z.; Dewald, H. D.; Chen, H. Chem. Comm. 2011, 47, 4171-4173.
Zhao, W. et al., "Complete Quantitative Online Analysis of Methanol Electrooxidation Products via Electron Impact and Electrospray Ionization Mass Spectrometry", Analytical Chemistry, vol. 84, No. 13, Jul. 3, 2012, pp. 5479-5483.
Zhao, W. et al., "Quantitative Online Analysis of Liquid-Phase Products of Methanol Oxidation in Aqueous Sulfuric Acid Solutions Using Electrospray Ionization Mass Spectrometry", Analytical Chemistry, vol. 82, No. 6, Mar. 15, 2010, pp. 2472-2479.
Zhao, W. et al., "Quantitative Online Detection of Volatile and Non-volatile Methanol Electrooxidation Products by Combined Electron Impact Mass Spectrometry and Electrospray Ionization Mass Spectrometry", ECS Transactions, vol. 35(12), 2011, pp. 9-19.
Zhou, F.; Van Berkel, G. J. Anal. Chem. 1995, 67, 3643-3649.
Childers, C. L.; Huang, H.; Korzeniewski, C. Langmuir 1999, 15, 786-789.
Aebersold, R. et al., Chem. Rev. 2001, 101, 269-296.
Becker, J.S. et al., Int. J. Mass Spectrom. 2003, 228, 985-997.
Bogialli, S. et al., "Confirmatory analysis of sulfonamide antibacterials in bovine liver and kidney: extraction with hot water and liquid chromatography coupled to a single- or triple-quadrupole mass spectrometer", Rapid Communications in Mass Spectrometry, vol. 17, No. 11, Jun. 15, 2003, pp. 1146-1156.
Chowdhury, S.K. et al., J. Am. Soc. Mass Spectrom. 1990, 1, 382-388.
Chrisman, P.A. et al., J. Am. Soc. Mass Spectrom. 2005, 16, 1020-1030.
Denes, J. et al., Anal. Chem. 2009, 81, 1669-1675.
Dixon, R.B. et al., J. Am. Soc. Mass Spectrom. 2007, 18, 1844-1847.
Fenn, J.B. et al. Science 1989, 246, 64-71.
Gronborg, M. et al., Mol. Cell Proteomics 2002, 1, 517-527.
Hartmanova, L. et al., "Fast profiling of anthocyanins in wine by desorption nano-electrospray ionization mass spectrometry", Journal of Chromatography A, vol. 1217, No. 25, Jun. 1, 2010, pp. 4223-4228.
Hu, L. et al., Angew. Chem. 2011, 123, 4219-4222; Angew. Chem. Int. Ed. 2011, 50, 4133-4136.

(56) References Cited

OTHER PUBLICATIONS

Hunter, T., Cell 2000, 100, 113-127.
International Preliminary Report on Patentability in International Patent Application No. PCT/US2013/063048, dated Jan. 19, 2016, 6 pgs.
International Preliminary Report on Patentability in International Patent Application No. PCT/US2013/068925, dated May 12, 2015, 8 pgs.
International Search Report and Written Opinion in International Patent Application No. PCT/US2013/063048, dated May 3, 2014, 8 pgs.
International Search Report and Written Opinion in International Patent Application No. PCT/US2013/068925, dated Mar. 19, 2014, 11 pgs.
Kharlamova, A. et al., J. Am. Soc. Mass Spectrom. 2011, 23, 88-101.
Krasny, L. et al., "In-situ enrichment of phosphopeptides on MALDI plates modified by ambient ion landing", Journal of Mass Spectrometry, vol. 47, No. 10, Oct. 27, 2012, pp. 1294-1302.
Kweon, H.K. et al., Anal. Chem. 2006, 78, 1743-1749.
Lane, A. et al., Proc. Natl. Acad. Sci. USA 2009, 106, 7314-7319.
Ma, X. et al., Anal. Chem. 2008, 80, 6131-6136.
McLachlin, D.T. et al., Curr. Opin. Chem. Biol. 2001, 5, 591-602.
Pan, N. et al., "Highly efficient ionization of phosphopeptides at low pH by desorption electrospray ionization mass spectrometry", The Analyst, vol. 138, No. 5, Jan. 1, 2013, p. 1321.
Perry, R.H. et al., Angew. Chem. 2011, 123, 264-268; Angew. Chem. Int. Ed. 2011, 50, 250-254.
Porath, J. et al., Nature 1975, 258, 598-599.
Posewitz, M.C. et al., Anal. Chem. 1999, 71, 2883-2892.
Poulter, L. et al., Biochim. Biophys. Acta 1987, 929, 296-301.
Qiu, B. et al., "Desorption electrospray ionization mass spectrometry of DNA nucleobases: implications for a liquid film model", Journal of Mass Spectrometry, vol. 44, No. 5, May 1, 2009, pp. 772-779.
Salih, E., Mass Spec. Rev. 2005, 24, 828-846.
Takats, Z. et al., Anal. Chem. 2004, 76, 4050-4058.
Takats, Z. et al., Science 2004, 306, 471-473.
Vasicek, L. et al., Anal. Chem. 2009, 81, 7876-7884.
Venter, A.R. et al., Anal. Chem. 2010, 82, 1674-1679.
Wiseman, J.M. et al., Angew. Chem. Int. Ed. 2005, 44, 7094-7097.
Xie, Y. et al., J. Am. Chem. Soc. 2006, 128, 14432-14433.
Zubarev, R.A. et al., J. Am. Chem. Soc. 1998, 120, 3265-3266.
Kharlamova, Anastasia, et al., "Electrospray Droplet Exposure to Gaseous Acids for the Manipulation of Protein Charge State Distributions," Analytical Chemistry, vol. 82, No. 17, Sep. 1, 2010, pp. 7422-7429, 8 pages.
Konermann, Lars, et al., "Unfolding of Proteins Monitored by Electrospray Ionization Mass Spectrometry: A Comparison of Positive and Negative Ion Modes," 1998 American Society for Mass Spectrometry, vol. 9, pp. 1248-1254, 7 pages.
U.S. Patent and Trademark Office, Final Office Action in U.S. Appl. No. 14/441,385, dated Feb. 27, 2017, 10 pages.
Ficarro et al., "Phosphoproteome analysis by mass spectrometry and its application to *Saccaromyces cerevisiae*," Nature Biotechnology (2002) 20:301-305.
Office Action in U.S. Appl. No. 14/441,385 dated Sep. 23, 2016, 10 pgs.
Samalikova et al., "Interpreting conformational effects in protein nano-ESI-MS spectra," Anal. Bioanal. Chem. (2004) 378:1112-1123.

* cited by examiner

ONLINE MONITORING OF FUEL CELL REACTIONS BY DESORPTION ELECTROSPRAY MASS SPECTROMETRY

CROSS-REFERENCE TO RELATED APPLICATION

This application claims the benefit of U.S. Provisional Patent Application Ser. No. 61/723,452, filed on Nov. 7, 2012, the disclosure of which is incorporated herein by reference in its entirety.

TECHNICAL FIELD

The present invention is related to an apparatus for monitoring fuel cell reaction products and a method of using the same.

BACKGROUND

Fossil fuel burning, the main energy source for human activity, has caused environmental issues such as global warming, ozone layer depletion, and ecological devastation. Thus, the development of alternative energy sources is needed. A fuel cell, an electrochemical device in which the chemical energy stored in fuel is converted directly to electrical current through an electro-catalytic process, is a good candidate for such an alternative energy source. The striking characteristics of fuel cells include their low environmental pollution and high energy conversion efficiency in comparison to heat engines. For instance, water is the only generated product in a hydrogen-oxygen fuel cell. Further, fuel cells have low noise levels. Because of these advantages, fuel cells have been regarded as an excellent energy source for portable electronics, land vehicles, airplanes, submarines, etc., and have attracted more and more attention in the new energy technology development field. Currently, numerous research efforts are underway to improve the performance of fuel cells, including large power and energy density, cheap catalyst, long shelf life, and ease of miniaturization for portable electronic devices.

Among a variety of fuel cells, a proton-exchange membrane (PEM) fuel cell is one of the principal types. Direct methanol fuel cells (DMFCs) are a subcategory of PEM fuel cells in which methanol is used as the fuel. The strengths of DMFCs are the ease of transport of methanol, an energy-dense yet reasonably stable liquid under all environmental conditions, and the lack of complex steam reforming operations. However, efficiency is presently quite low for these cells, so they are targeted especially for portable applications, in which energy and power density are more important than efficiency. Indeed, the energy density of methanol is an order of magnitude greater than even highly compressed hydrogen, and 15 times higher than lithium-ion batteries. Military applications of DMFCs are an emerging area because DMFCs have low noise, thermal signatures and no toxic effluent. The DMFC relies upon the oxidation of methanol on a catalyst layer to form carbon dioxide. However, the electrooxidation of methanol often results in a variety of incomplete oxidation products such as formaldehyde (HCHO), formic acid (HCOOH), methyl formate ($HCOOCH_3$), and carbon monoxide (CO). These byproducts could deactivate expensive cell catalysts and thus the fuel cell itself.

Therefore, it is highly desirable to have a fast, selective, and sensitive device to identify and quantify the fuel cell reaction products for a fundamental understanding of the reaction mechanism, as well as to screen the best catalyst and the reaction conditions. Many analytical techniques such as infrared spectroscopy, fluorescent spectroscopy, and electrochemical detectors have been employed to monitor the products resulting from methanol oxidation reactions, but these techniques lack detection selectivity. For example, differential electrochemical mass spectrometry (DEMS) has been adopted to probe fuel cell reactions; however, it only can detect volatile and small molecules such as $CO_2$ and CO and is blind to HCHO and HCOOH, which cannot easily penetrate the membrane separating the electrochemical cell and the mass spectrometer chamber. In addition, recent efforts have been made to detect HCHO using electrospray ionization (ESI) mass spectrometry (MS) after online extraction of fuel cell products. However, the method involves complicated sample transfer lines and laborious extraction. Therefore, there is an urgent need for the development of analytic techniques that are fast, highly selective and sensitive to identify different cell reaction products, particularly those byproducts such as HCHO and HCOOH, in addition to $CO_2$.

Desorption electrospray ionization (DESI) is a recent advance in the field of MS. DESI provides direct ionization of analytes with little or no sample preparation. Sample ionization by DESI occurs via the interactions with charged microdroplets generated in a pneumatically assisted electrospray of an appropriate solvent. In addition to analysis of solid samples, DESI has been extended to directly ionize liquid samples, and its demonstrated applications include the coupling of MS with chromatography, microfluidics, and electrochemistry, probing protein conformation, and developing submillisecond time-resolved MS.

SUMMARY

In one illustrative embodiment of the present invention, a mass spectrometry-based method of directly detecting reaction products of a fuel cell is described. The method includes passing a reactant sample through a fuel cell to form reaction products that exit the fuel cell in an output stream. The method also includes adding a derivatizing reagent to the output stream to form a derivatized output stream, wherein the derivatizing reagent reacts with a potential reaction product to thereby form a derivatized reaction product if the potential reaction product is present. The method further includes directing a charged solvent toward the derivatized output stream to thereby ionize the derivatized output stream and directing the ionized, derivatized output stream to a mass spectrometer, the mass spectrometer being configured to detect the derivatized reaction product.

In another illustrative embodiment, an apparatus to detect reaction products from a fuel cell reaction is described. The apparatus includes a fuel cell having an inlet configured to receive a reactant sample, a reaction chamber in direct communication with the inlet, the reaction chamber being configured for reaction products to be formed therein, and a conduit in direct communication with the reaction chamber. The conduit is configured for the reaction products to exit the fuel cell therethrough in an output stream. The conduit has a derivatizing reagent inlet and an outlet. The apparatus also includes an ambient ionizer configured to generate a charged solvent and to direct the charged solvent toward the conduit outlet. The apparatus further includes a mass spectrometer having a sample entrance adjacent the conduit outlet.

The objects and advantages of the present invention will be further appreciated in light of the following detailed description and drawings provided herein.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the principles of the invention.

DETAILED DESCRIPTION

Figure 1:
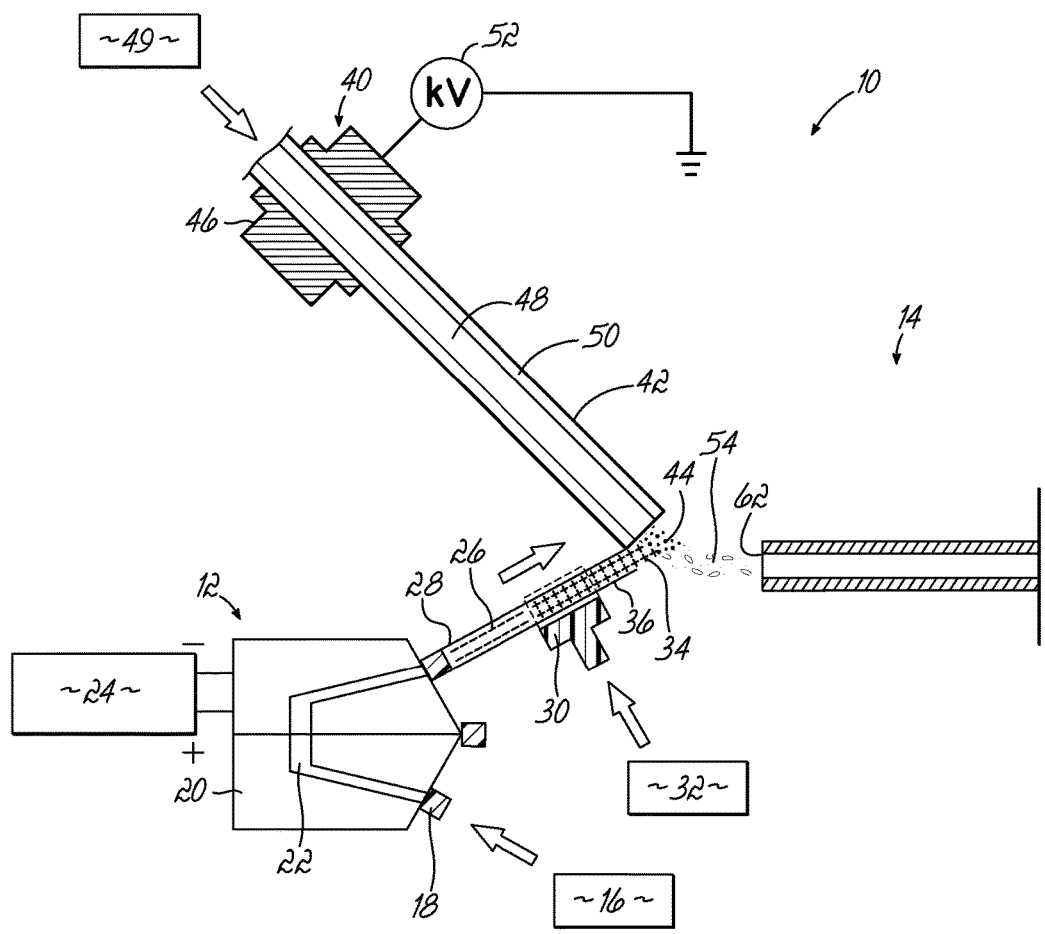
FIG. 1 is a diagrammatic cross sectional view of an embodiment of the present invention.

Briefly, the present invention provides a DESI-MS apparatus for online, real-time monitoring of fuel cell reaction products with high selectively and sensitivity. FIG. 1 illustrates an apparatus 10 for coupling an electrochemical fuel cell 12 with a mass spectrometer 14 by DESI.

In an embodiment, the fuel cell 12 may be a PEM fuel cell, and more specifically, a DFMC, for example. A sample of reactants 16 enters the fuel cell 12 at inlet 18. The sample 16 may comprise MeOH in water (1-10% by volume), containing approximately 0.01 M to approximately 0.5 M $H_2SO_4$. The inlet 18 is in direct communication with reaction chamber 20. The reaction chamber 20 includes an electrode 22, such as a Pt working electrode. A potentiostat 24 is used to apply potentials to the fuel cell 12 for triggering methanol oxidation when a sample of reactants 16 flows through the fuel cell 12. The methanol oxidation produces reaction products. The flow rate of the sample 16 flowing through the fuel cell 12 may be approximately 0.1 µL/min to approximately 50 µL/min.

An output stream 26 from the fuel cell 12 includes the fuel cell reaction products. The output stream 26 may exit the fuel cell 12 via a conduit 28 that is in direct communication with the reaction chamber 20. For example, the conduit 28 may comprise a fused silica transfer capillary with an inner diameter of approximately 50 µm to approximately 100 µm. The conduit 28 includes a derivatizing reagent inlet 30, where derivatizing reagent 32 is introduced into the output stream 26 of the fuel cell reaction products in the conduit 28. The inlet 30 may comprise a Tee mixer for injecting the derivatizing reagent 32 into the conduit 28. The derivatizing reagent 32 is injected into the conduit 28 at a rate of approximately 1 µL/min to approximately 10 µL/min. When a potential fuel cell reaction product is present in the output stream 26, the derivatizing reagent 32 may react with the potential reaction product to form a derivatized reaction product in a derivatized output stream 34. For example, for HCHO detection, the derivatizing reagent 32 may comprise $PhNHNH_2$ (0.1%) in water. Alternatively, for $CO_2$ detection, the derivatizing reagent 32 may comprise NaOH (0.01M) in water. The derivatized output stream 34 exits the conduit at outlet 36.

In the apparatus 10 shown in FIG. 1, the ambient ionizer 40 having a spray probe 42 generates microdroplets of a charged solvent 44 and directs the charged solvent 44 toward the derivatized output stream 34 that emerges from the conduit outlet 36. The spray probe 42 may be positioned approximately 0.5 mm to approximately 5 mm from the conduit outlet 36, for example. The charged solvent 44 ionizes the derivatized output stream 34.

In an embodiment, the ambient ionizer 40 may be a DESI apparatus that includes a housing 46 having a solvent conduit 48 for solvent 49 surrounded by a gas conduit 50. For HCHO detection, the solvent 49 that is supplied to the ambient ionizer 40 may comprise ACN (acetonitrile)/$H_2O$/ 1% HOAc (acetic acid). Alternatively, for $CO_2$ detection, the solvent 49 may comprise ACN/$H_2O$/3% $NH_4.H_2O$. A voltage generator 52 is attached to the housing 46 and is operable to charge the solvent 49 within the solvent conduit 48. The DESI apparatus generates a nebulized, charged solvent 44 that ionizes the derivatized output stream 34 by desorption, forming an ionized, derivatized output stream 54. The DESI apparatus may operate at a flow rate of approximately 1 µL/min to approximately 100 µL/min. An LS-DESI-MS system is described in further detail in U.S. Pat. Nos. 7,915,579 and 8,330,119, the disclosures of which are incorporated in their entireties herein by reference. As an alternative to DESI, it would be understood that any ambient ionizer 40 apparatus could be used to effect photo, ion beam, high energy particle, or plasma-based ionization, for example.

The spray impact of the microdroplets of charged solvent 44 from the spray probe 42 with the derivatized reaction product 34 ionizes and deflects an ionized portion of the derivatized reaction product 54 into a mass spectrometer 14. The mass spectrometer 14 has a sample entrance or opening 62, such as a heated capillary, which is also positioned near the conduit outlet 36 and the spray probe 42 of the ambient ionizer 40. For example, the opening 62 may be positioned approximately 0.5 cm to approximately 4 cm from the spray probe 42. The ionized, derivatized fuel cell output stream 54 enters the opening 62, where a pump (not shown) maintains the atmosphere in the mass spectrometer 14 as a vacuum. The mass spectrometer 14 analyzes a mass-to-charge ratio of the ionized, derivatized output stream 54, as described in U.S. Pat. Nos. 7,915,579 and 8,330,119. As such, the DESI apparatus 40 provides a simplified way of coupling the fuel cell 12 to the mass spectrometer 14 because it is not necessary to separate the small potential applied to the fuel cell 12 from the high voltage used for spray ionization.

In use, a reactant sample 16 is introduced to a fuel cell 12 at an inlet 18. The reactant sample 16 flows into a reaction chamber 20, in which reaction products are formed. The reaction products exit the fuel cell 12 as an output stream 26 through a conduit 28. A derivatizing reagent 32 is then injected into the output stream 26 with a Tee mixer at a derivatizing reagent inlet 30 in the conduit 28. If a potential reaction product is present, the derivatizing reagent 32 reacts therewith to form a derivatized reaction product in a derivatized output stream 34. The derivatized output stream 34 exits the conduit 28 at outlet 36.

Solvent 49 enters ambient ionizer 40, which generates a charged solvent 44 that is directed toward the outlet 36 of the conduit 28 so as to ionize the derivatized output stream 34. The ionized, derivatized output stream 54 is directed to a mass spectrometer 14 for mass-to-charge ratio analysis, which detects the fuel cell 12 reaction products. When a DMFC is used, this method detects both $CO_2$ and HCHO generated from methanol oxidation from the fuel cell 12. The method is highly selective, sensitive, and fast. The method further provides tolerance to inorganic salt electrolytes and the freedom to choose traditional solvents for electrolysis or to use either positive or negative ionization modes.

In an alternative embodiment, rather than being introduced at the derivatizing reagent inlet 30 in the conduit 28, the derivatizing reagent 32 may be directly doped with the solvent 49, such that the derivatizing reagent 32 reacts with the potential reaction product during ionization.

The following example illustrates particular properties and advantages of an embodiment of the present invention.

Experiment 1

A DESI apparatus 40 was built for coupling an electrochemical fuel cell 12 with a Thermo Finnigan LCQ DECA ion trap mass spectrometer 14 (San Jose, Calif.). The fuel cell 12, which was equipped with a Pt working electrode 22, was employed for methanol oxidation experiments. A reactant sample 16 of MeOH and $H_2O$ containing $H_2SO_4$ as electrolyte was prepared and infused by syringe pump for electrolysis. The reactant sample 16 was passed through the fuel cell 12 for electrolysis at a flow rate of 5 μL/min. A ROXY potentiostat 24 (ANTEC BV, Netherlands) was used to apply potentials to the fuel cell 12 for triggering methanol oxidation when the reactant sample 16 flowed through the fuel cell 12.

An output stream 26 comprising reaction products exited the fuel cell 12 via a capillary 28 and underwent derivatization with a derivatizing reagent 32 injected through a Tee mixer 30. The derivatized output stream 34 was online ionized by DESI via interactions with charged microdroplets 44 from DESI spray and then detected by the nearby mass spectrometer 14. The DESI spray probe 42 was aimed at the mass spectrometer's 14 inlet orifice 62 and kept approximately 3 cm to approximately 4 cm away from the mass spectrometer inlet 62. For detection of HCHO, the derivatizing reagent 32 was 1% phenylhydrazine in water at an injection flow rate of 5 μL/min, and the DESI spray solvent 49 was $ACN/H_2O/1\%$ HOAc at an injection flow rate of 10 μL/min. The positive ion mode was used for ion detection. For detection of $CO_2$, the derivatizing reagent 30 was 0.01M NaOH in water at an injection flow rate of 5 μL/min, and the DESI spray solvent 49 was $ACN/H_2O/3\%$ $NH_3.H_2O$ with an injection flow rate of 10 μL/min. The negative ion mode was used for ion detection.

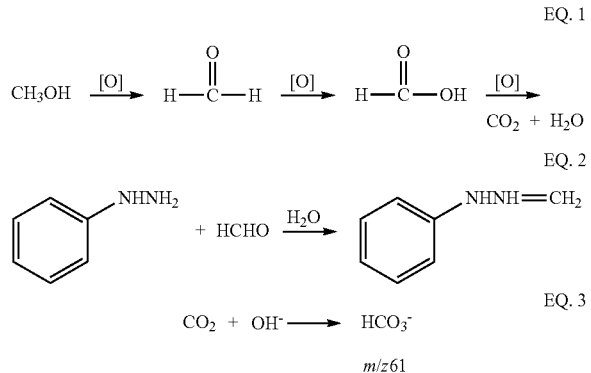

Equation 1 depicts the possible oxidation process for methanol, in which incomplete oxidation produces HCHO and HCOOH and complete oxidation generates $CO_2$. As the oxidation products emerge from the fuel cell 12, HCHO can be ionized by DESI after the derivatization reaction with 2,4-dinitrophenylhydrazine ions (Equation 2). The resulting hydrozone product can be easily charged as positive ions (for example, the protonated hydrozone $PhNHNH=CH_2$ of m/z 121) for MS detection. On the other hand, $CO_2$ can be converted to $HCO_3^-$ (m/z 61) via absorption by NaOH in water and detected in the negative ion mode (Equation 3).

Figure 2A:
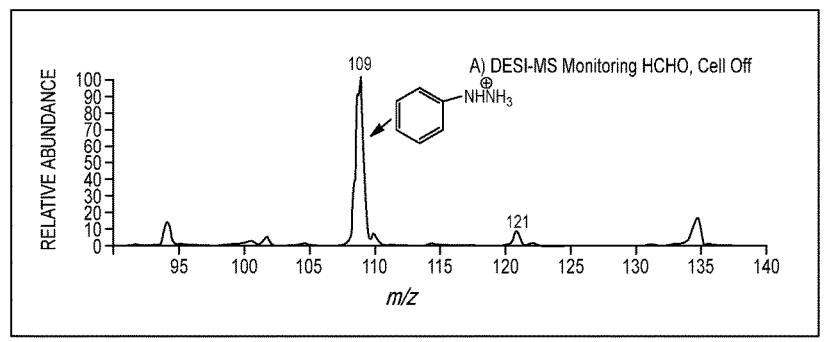
FIGS. 2A-2C are positive ion DESI-MS spectra according to Experiment 1.
Figure 2B:
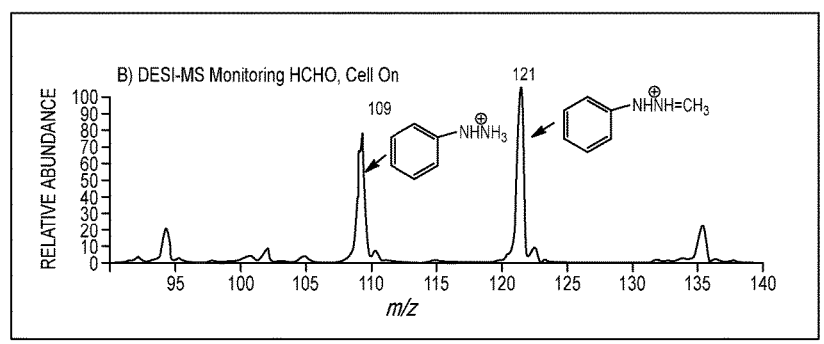
Figure 2C:
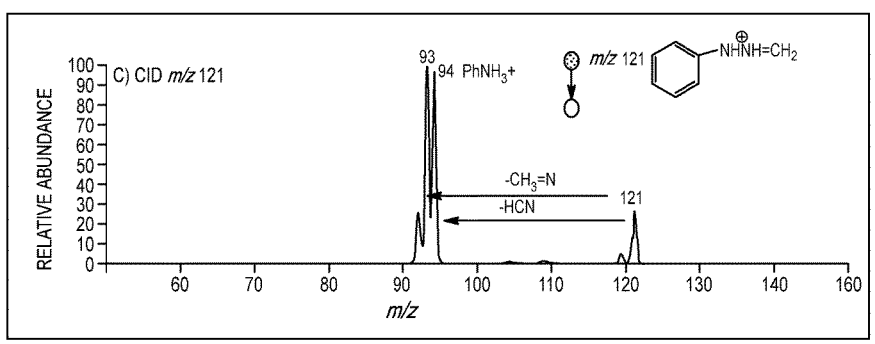

FIGS. 2A-2C show positive ion DESI-MS spectra acquired when a sample 16 of 2.3% MeOH in $H_2O$ (by volume) containing 0.01 M $H_2SO_4$ was flowed through the fuel cell 12 with varying applied potentials. FIG. 2A shows the results when the fuel cell 12 was turned off so that no potential was applied, and the sample 16 then underwent derivatization with phenylhydrazine. Only a small peak of m/z 121 was detected, which corresponded to the protonated ion of the phenylhydrazine-derivatized HCHO product. The methanol may have contained trace amount of HCHO. FIG. 2B shows that when the fuel cell 12 was turned on with a 2V potential applied to the Pt working electrode 22, the peak of m/z 121 rose drastically. This result indicates that the methanol oxidation in the fuel cell 12 does produce incomplete oxidation product HCHO which can be monitored by DESI. FIG. 2C shows a collision-induced dissociation (CID) tandem mass spectrometry (MS/MS) spectrum of the product ion $[PhNHN=CH_2+H]^+$, the ion of m/z 121 gave rise to fragment ions m/z 93 and 94 by losses of $CH_2N$ and HCN, respectively, confirming its structure.

Figure 3A:
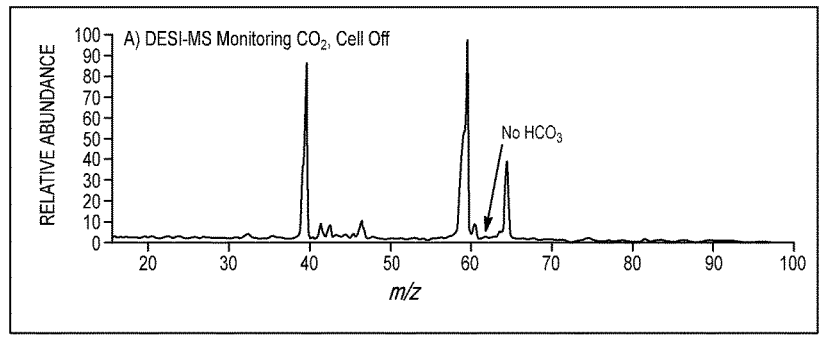
FIGS. 3A-3C are negative ion DESI-MS spectra according to Experiment 1.
Figure 3B:
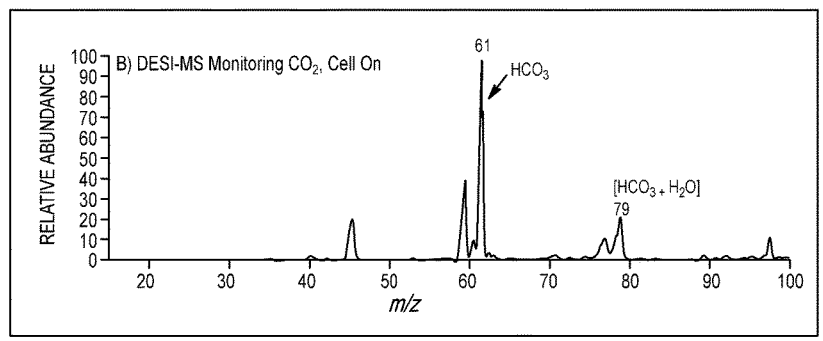
Figure 3C:
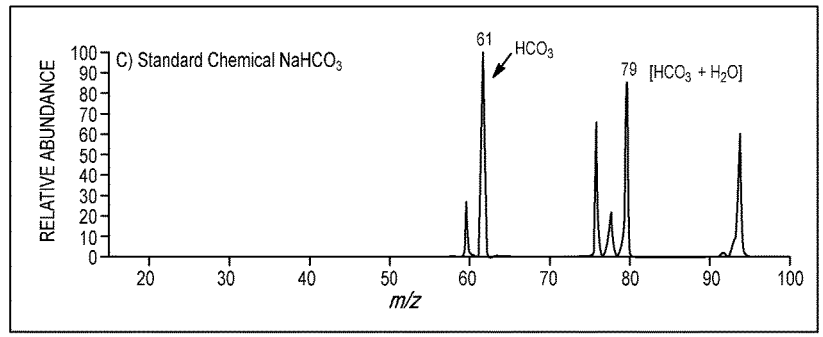

FIGS. 3A-3C show negative ion DESI-MS spectra acquired when the sample 16 described above with respect to FIGS. 2A-2C was run through the fuel cell 12. As shown in FIG. 3A, when no potential applied and the solution underwent derivatization with NaOH in water, no $HCO_3^-$ ion (m/z 61) was detected. As shown in FIG. 3B, in contrast, when the fuel cell 12 was turned on with a 2V potential applied to the Pt working electrode 22, the peak of m/z 61 arose. Also, adduct ion $[HCO_3^-+H_2O]$ was also detected. This indicates that the methanol oxidation in the fuel cell 12 does produce $CO_2$, which can be monitored by DESI after conversion to $HCO_3^-$ ion (m/z 61). FIG. 3C is a negative ion DESI-MS spectrum of a standard $NaHCO_3$ aqueous sample ionized by DESI under the same ionization condition. Both m/z 61 and 79 were observed, in line with the assignment of those ions in FIG. 3B.

The detection of $CO_2$ by DESI-MS is remarkable, as the detection can be done under ambient conditions. Previously, the mass spectrometric detection of $CO_2$ from electrochemical cells required specialized instruments, namely, differential electrochemical mass spectrometry (DEMS), in which $CO_2$ is leaked into an electron impact ion source in vacuum through a membrane for ionization.

This invention demonstrates the feasibility of using DESI-MS to analyze both complete oxidation product $CO_2$ and incomplete oxidation product HCHO under ambient conditions. This method is fast, highly sensitive and highly selective. The method according to the present invention does not involve complicated extraction steps, and, thus, the analysis time is shortened. It also involves simple instrumentation. The capability of detecting both $CO_2$ and HCHO will allow one to study the methanol oxidation fuel cell reaction mechanism and to screen optimal catalysts as electrode materials for improved cell performance. In comparison to other detection methods, the present method has high specificity. In addition, the ability to direct detection of analyte in a highly acidic media (for example, in $H_2SO_4$ media) is another strength of DESI over other traditional ionization methods.

As explained above, this invention presents a novel method of using combined EC with DESI-MS for online, real-time monitoring of fuel cell reaction products. Combined EC/MS techniques have proven to be powerful in identifying the products/intermediates of electrochemical reactions. The advantages of this technique stem from the fact that MS is a highly sensitive and selective detector and is able to provide molecular weight information, as well as structural information. The methodology along with its novel apparatus should have high commercial value in today's energy research product market, as it is very useful for the mechanistic elucidation of methanol oxidative process, improving fuel cell 12 design, and discovering new effective fuel cell catalysts.

This has been a description of the present invention along with the various methods of practicing the present invention. However, the invention itself should only be defined by the appended claims.

What is claimed is:

1. A mass spectrometry-based method of directly detecting fuel cell reaction products, the method comprising:
   passing a reactant sample through a proton-exchange membrane fuel cell to form reaction products that exit the fuel cell in an output stream;
   adding a derivatizing reagent to the output stream to form a derivatized output stream, wherein the derivatizing reagent reacts with a potential reaction product to thereby form a derivatized reaction product if the potential reaction product is present;
   without extracting any of the reaction products or the derivatized reaction product from the derivatized output stream, directing a charged solvent generated by desorption electrospray ionization toward the derivatized output stream thereby ionizing the derivatized output stream, said charged solvent directing the ionized, derivatized output stream directly to a mass spectrometer, the mass spectrometer being configured to detect the derivatized reaction product.

2. The method of claim 1, wherein the fuel cell is a direct methanol fuel cell.

3. The method of claim 1, wherein the reactant sample includes approximately 0.01 M to approximately 0.5 M $H_2SO_4$.

4. The method of claim 1, wherein the method is configured to detect HCHO.

5. The method of claim 1, wherein the method is configured to detect $CO_2$.

6. The method of claim 4, wherein the derivatizing reagent comprises $PhNHNH_2$.

7. The method of claim 5, wherein the derivatizing reagent comprises NaOH.

8. The method of claim 1, wherein the derivatized output stream that is ionized by the charged solvent includes a mineral acid.

9. An apparatus for detecting fuel cell reaction products, the apparatus comprising:
   a proton-exchange membrane fuel cell comprising:
      an inlet configured to receive a reactant sample;
      a reaction chamber in direct communication with the inlet, the reaction chamber configured for reaction products to be formed therein; and
      a conduit in direct communication with the reaction chamber, the conduit configured for the reaction products to exit the fuel cell therethrough in an output stream, the conduit having a derivatizing reagent inlet downstream of the fuel cell and an outlet downstream of the derivatizing reagent inlet configured for a derivatized reaction product to exit the conduit therethrough in a derivatized output stream;
   a mass spectrometer having a sample entrance adjacent the conduit outlet; and
   an ambient ionizer configured to generate a charged solvent for ionizing the derivatized output stream via desorption electrospray ionization and configured to direct the ionized, derivatized output stream directly to the mass spectrometer,
   wherein the apparatus is free of an online extraction system for extracting a portion of the reaction products or the derivatized reaction product from the derivatized output stream prior to the ambient ionizer.

10. The apparatus of claim 9, wherein the fuel cell is a direct methanol fuel cell.

11. The apparatus of claim 10, wherein the reactant sample includes approximately 0.01 M to approximately 0.5 M $H_2SO_4$.

12. The apparatus of claim 9, wherein the method is configured to detect HCHO.

13. The apparatus of claim 9, wherein the method is configured to detect $CO_2$.

14. The apparatus of claim 12, wherein the derivatizing reagent comprises $PhNHNH_2$.

15. The apparatus of claim 13, wherein the derivatizing reagent comprises NaOH.

16. The apparatus of claim 9, wherein the derivatizing reagent inlet is configured to introduce derivatizing reagent into the output stream in the conduit,
   wherein the derivatizing reagent is configured to react with a potential reaction product to thereby form a derivatized reaction product if the potential reaction product is present.

17. The apparatus of claim 9, wherein the derivatized output stream that is received by the ambient ionizer includes a mineral acid.

* * * * *